Aug. 26, 1958 — G. H. HILL — 2,848,909
INDEXING APPARATUS
Filed April 3, 1956 — 2 Sheets-Sheet 1

INVENTOR.
George H. Hill.
BY Ross Ross, Atty.

Aug. 26, 1958     G. H. HILL     2,848,909
INDEXING APPARATUS
Filed April 3, 1956     2 Sheets-Sheet 2
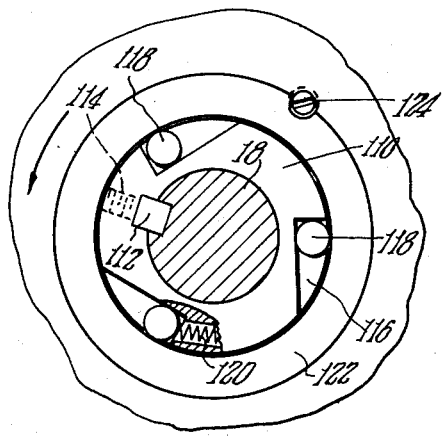
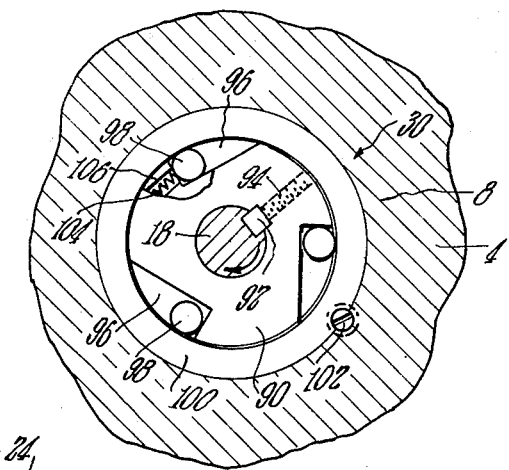
INVENTOR.
George H. Hill.

United States Patent Office 2,848,909
Patented Aug. 26, 1958

2,848,909

INDEXING APPARATUS

George H. Hill, Williamsburg, Mass.

Application April 3, 1956, Serial No. 575,768

2 Claims. (Cl. 74—822)

This invention relates to new and useful improvements in indexing apparatus.

The principal object of the invention is directed to the provision of indexing apparatus for moving work pieces or jigs or fixtures holding work pieces in a step by step manner through predetermined angles to accurately position work pieces relative to tools and the like.

The apparatus of the invention is characterized by a reciprocating operating member and connections between said member and a rotatable member so as to move a work table through successive indexing angles.

According to novel features of the invention, a work table is locked against movement following each indexing movement and is unlocked for indexing movements thereby to insure accuracy in the indexing movements.

The construction of the apparatus is such as to prevent overtravel of the components in indexing movements which may result from inertia, all to the end that accurate indexing is insured.

According to one feature of the invention, an operating member is reciprocated by a piston in a cylinder and is actuated by pressure, which affords desirable cushioning effects and at the same time positive operation contributing to the accuracy which is so much desired in indexing operations.

According to an important feature of the invention, means is provided for maintaining and adjusting the index cycle to an original cycle thereby enhancing the accuracy of the device.

Various novel features of the invention and the advantages thereof will be apparent from the following description wherein:

Fig. 3, is a plan view on the line 3—3 of Fig. 1, to illustrate the brake of the apparatus;

Fig. 4, is a view similar to Fig. 3, to illustrate the clutch of the apparatus;

Fig. 5, is a sectional view on the line 5—5 of Fig. 1; and

Fig. 6, is a sectional view showing gage means for the cover plate and ratchet of the apparatus.

Figure 1:
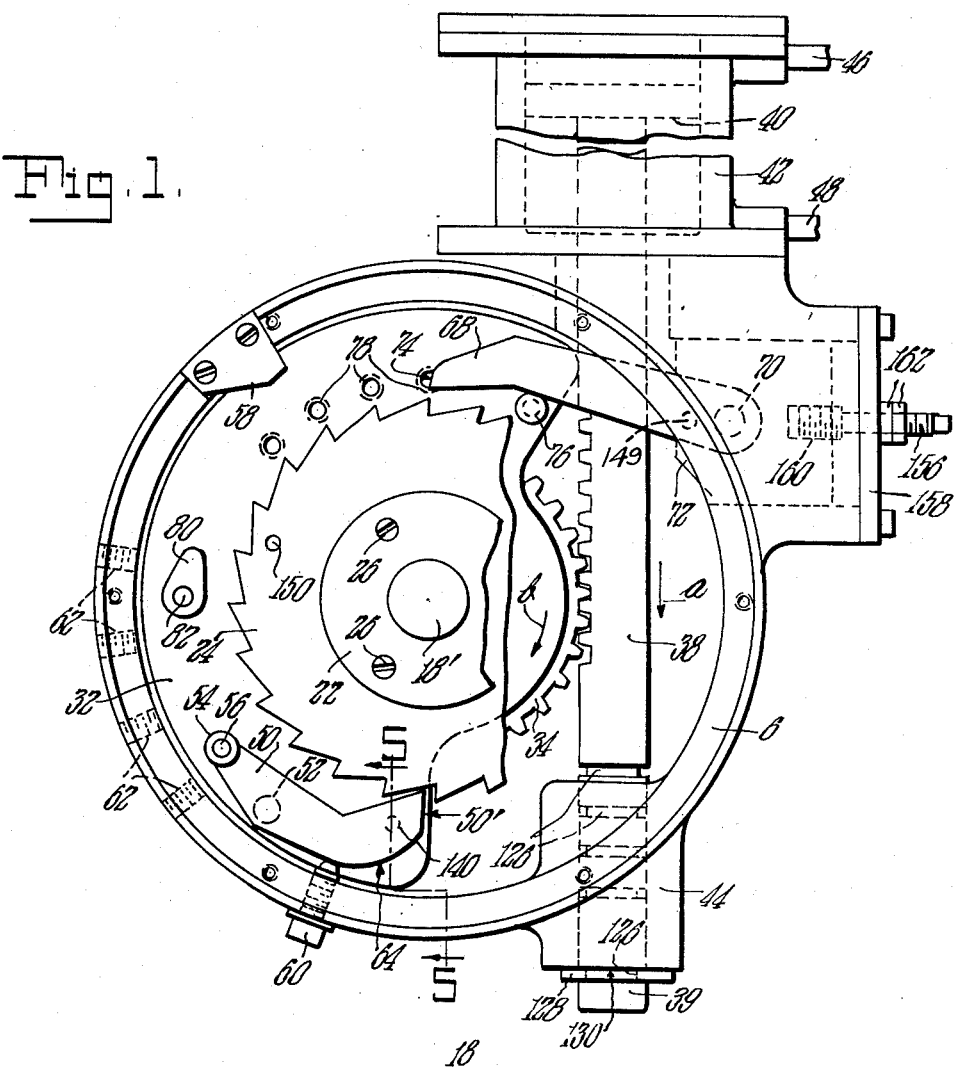
Fig. 1, is a plan view of indexing apparatus embodying the novel features of the invention, the table and cover plate being omitted for clearness.

Referring now to the drawings more in detail, the invention will be fully described.

A housing 2 has a bottom wall 4 and a vertically extending side wall 6 integral therewith. A hub 8 extends upwardly from the bottom wall 4 and has a bearing 10 therein which is preferably of the anti friction type.

A bolster or cover plate 12 is secured to the upper termination of the side wall 6 by screws, such as 14, and carries an upper bearing 16.

A central stud 18 has a table 20 secured to the upper end 18' thereof above the bolster or cover plate 12. Said stud 18 has an annular flange 22 which is journalled in the bearing 16. A lower intermediate portion of the stud 18 is journalled in the bearing 10.

A ratchet wheel 24, having circumferentially spaced teeth, as shown, is disposed beneath the flange 22 of the stud 18 and is secured thereto by any suitable means, such as screws 26.

Figure 2:
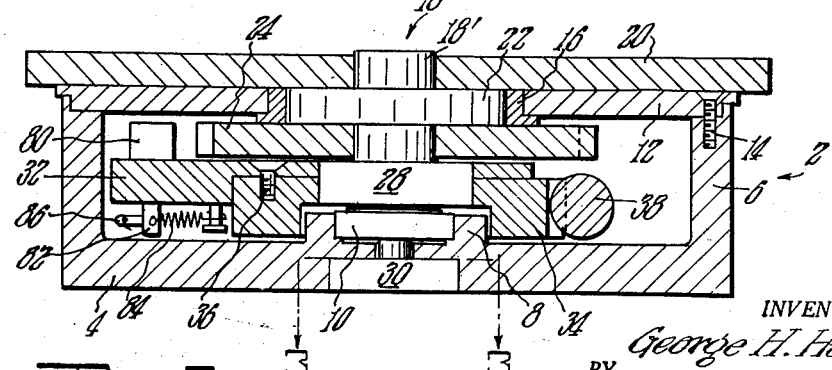
Fig. 2, is a transverse sectional elevational view through the apparatus shown in Fig. 1.

A clutch element 28 and a brake element 30 are shown in Fig. 2 and will subsequently be described in detail.

A carrier 32 is associated with the clutch 28 and has a gear 34 fixed to the underside thereof by any suitable means, such as screws 36 in Fig. 2.

A rod or rack 38, extending from a piston 40 reciprocable in a cylinder 42, is provided with longitudinally spaced teeth, as shown, and has an outer end 39 reciprocable in a bearing 44 of the housing.

The teeth of the rack 38 are in mesh with the teeth of the gear 34, as shown.

The cylinder 42 will be secured to the housing 2 in any well known manner.

Connections 46 and 48 may be connected to a source of air or hydraulic pressure so as to reciprocate the piston 40, and thereby the rack 38, in opposite directions. Outward movement of the rack 38 in the direction of arrow a (Fig. 1) is the indexing direction of said rack and, in this direction, the gear 34 and carrier 32 are indexed clockwise in the direction of arrow b (Fig. 1).

A ratchet wheel lock 50 is pivoted at 52 to the carrier 32 and has a forward face 50' for engaging the teeth of the ratchet wheel 24.

A cam roll 54 is journalled at 56 to the rear end of the ratchet wheel lock 50. This cam roll 54 is engageable by a cam 58 secured to the side wall 6 of the housing 2 as the carrier 32 rotates clockwise. Engagement of the cam roll 54 and cam 58 swings the ratchet wheel lock 50 so that its forward face 50' disengages the tooth of the ratchet wheel 24.

A threaded pin cam 60 is provided for screwing into any one of a number of tapped holes 62 of the side wall 6.

As the carrier 32 rotates counterclockwise, the curved surface 64 of the ratchet wheel lock 50 engages the inner end of the pin cam 60 so that the forward face 50' of the ratchet wheel lock is positioned in front of a tooth of the ratchet wheel 24.

A ratchet stop 68 is pivoted at 70 to a member 72 and has a forward face 74 for engaging a tooth of the ratchet wheel 24.

A throwout or lifter 76 is provided and is screw threaded for engaging in any one of a number of tapped sockets 78 provided in the carrier 32.

In counterclockwise rotation of the carrier 32, the throwout 76 is adapted to engage the ratchet stop 68 and to swing it outwardly so as to remove the forward face 74 of the ratchet stop from engagement with a tooth of the ratchet wheel 24.

A cam 80 has a shaft 82 journalled in the carrier 32. A spring 84 having opposite ends connected to a pin 86 of the shaft 82 and stud 83 of the carrier, urges the cam 80 in a clockwise direction. In clockwise rotation of the carrier 32, the cam 80 engages and rides up on the upper outer side of the ratchet stop 68 so as to urge it inwardly whereby the forward face end 74 thereof engages a tooth of the ratchet wheel 24.

The brake 30 prevents counterclockwise rotation of the central stud 18, and is shown in Fig. 3. A hub 90 is fixed to said stud 18 by a key 92 pressed inwardly by a screw 94, and has a plurality of recesses 96, as shown. Balls or rollers 98 are disposed in the recesses 96. An annulus 100 is fixed in the lower wall 4 of the housing by a screw or screws 102. Springs 104 in sockets 106 of the hub 90 urge the rollers 98 outwardly in the well known manner.

As stud 18 rotates clockwise, the rollers 98 are free of the annulus 100. Stud 18 is held against counter clockwise rotation as the rollers 98 are wedged between the recesses 96 and the inner surface of the annulus 100. Thus, the stud 18 and ratchet wheel 24 secured thereto are prevented from counter clockwise rotation.

Clutch 28 permits free counter clockwise rotation of carrier 32 and gear 34 around the center stud 18. Clockwise rotation of said carrier and gear causes the center stud 18 and ratchet wheel 24 to be rotated clockwise (see Fig. 4).

A hub 110 is fixed to the stud 18 by a key 112 and screw 114. Said hubh is provided with recesses 116 in which are balls or rollers 118 urged outwardly by springs such as 120. An annulus 122 is secured in the carrier 32 by a screw or screws, such as 124. As the carrier 32 and gear 34 rotate clockwise, the rollers 118 are wedged between the recesses 116 and annulus 122 so that hub 110 and thereby stud 18 are rotated clockwise. Brake mechanism 30 permits clockwise rotation of the stud 18 which carries the ratchet wheel and table.

The outer end 39 of rack 38 is provided with longitudinally spaced annular grooves 126 in which a snap ring 128 of well known form is receivable. As the rack 38 moves inwardly or in non-indexing direction, the snap ring 128 abuts the end 130 of the bearing 44. Thus, by placing the snap ring 128 in a certain groove, a certain length of travel may be selected for the rack 38.

Detent means is provided for ratchet wheel lock 50, as shown in Fig. 5. A ball 140 is urged upwardly by a spring 142 in a bore 144 of the carrier 32 which is closed by a screw 146. Indentations 148 in the lower side of the ratchet wheel lock 50 are spaced apart to receive the ball 140 so that the ratchet wheel lock 50 is releasably held in its locked or unlocked position.

A detent arrangement for the ratchet stop 68 is provided and is indicated by 149. Such releasably holds the ratchet stop in its inner stop or outer non-stop positions and will be similar to the arrangement shown in Fig. 5.

The rod rack 38 is in retracted position for an indexing movement. As pressure is applied to the piston 40 to move rack 38, the gear and carrier 32 are rotated clockwise according to the indexing stroke of said rack. At the end of said stroke, cam 80 rides up on and moves ratchet stop 68 inwardly so that its forward end engages a ratchet tooth limiting the angle of movement of the table and the cam roll 54 engages the cam 58 to swing ratchet wheel lock 50 from engagement with a ratchet tooth. Thus the table is indexed through a certain angle.

As pressure on the piston 40 is reversed to retract rack 38, carrier 32 and gear 34 are rotated counter clockwise, stud 18 and the ratchet and table being held against counter clockwise movement. Just prior to the completion of the retracting of the rack, when the snap ring will abut surface 130, the ratchet wheel lock 50 is engaged by the pin cam 60 so that its inner end 50' will lie in front of a ratchet tooth and member 76 will lift the stop from engagement with a ratchet tooth.

By locating members 60 and 76 in certain tapped holes 62 and 78 and by locating the snap ring 38 in a certain groove, it is possible to obtain a predetermined index angle in each stroke of the rack 38.

It is possible to bring the ratchet wheel 24 to its original or base position at any time. For that purpose, the ratchet wheel 24 is provided with a hole 150 which is registrable with a hole 152 in the cover plate 12. A gage pin G is insertable in said holes. The forward end 74 of stop 68 may then be set accurately relative to a tooth of the ratchet wheel. For this purpose, member 72 is slidable in the housing. A screw 156 in threaded engagement with a member 158 fixed to the housing has a threaded inner end 160 engaging member 72. By turning the screw, member 72 and stop 68 are moved back and forth. The screw 156 is locked in place by nuts 162.

Various changes and modifications may be made in the apparatus without departing from the spirit and scope of the invention and what it is desired to claim and secure by Letters Patent of the United States is:

1. Indexing apparatus comprising a support, a stud journalled in said support, a toothed ratchet fixed to said stud, a cylinder having a piston reciprocable therein in indexing and non-indexing directions, a rack extending from the piston in said cylinder and being reciprocable in said support in indexing and non-indexing directions, an integral gear and carrier unit rotatable in indexing and non-indexing directions on said stud, a brake mechanism between said stud and support limiting rotation of said stud to the indexing direction, a clutch mechanism between said stud and gear and carrier unit for rotating said stud in the indexing direction as said gear and carrier unit rotates in the indexing direction, stop means movable on said support and being movable between non-stop and stop positions in engagement with said ratchet to stop said stud against rotation in the indexing rotation, stop actuating means on said gear and carrier unit being engageable with said stop means and operable upon the rotation of said gear and carrier unit in the indexing direction for actuating said stop means to the stop position, other means on said gear and carrier unit being operable upon rotation of said gear and carrier unit in the non-indexing direction for actuating said stop means to the non-stop position, lock means movable on said gear and carrier unit between lock and non-lock positions in engagement with said ratchet, lock actuating means on said support being swingable by said lock means as said gear and carrier unit rotates in the indexing direction for moving said lock means to the non-lock position, and other actuating means on said support for moving said lock means to the lock position as said gear and carrier unit rotates in the non-indexing direction.

2. Indexing apparatus comprising, a support, a stud journalled in said support, a ratchet fixed to said stud, a table fixed to said stud, a gear, a carrier integral with said gear, said gear and carrier being mounted on said stud by means providing rotation of said stud in indexing direction and permitting free rotation of said gear and carrier relative to said stud in an non-indexing direction, means connecting said stud and support and permitting rotation of said stud in indexing rotation and holding said stud against rotation in non-indexing direction, an operating member reciprocable in said support in indexing and opposite directions and having teeth for engagement with said gear, locking means swingable on said carrier for engaging said ratchet in rotation of said carrier in indexing direction to rotate said ratchet, operating means alternately to engage and disengage said locking means and ratchet, a stop member swingable relative to said support and being engageable with said ratchet for holding said ratchet against rotation in the non-indexing direction, and actuating means alternately to engage and disengage said stop member and ratchet, said operating means including separate members fixed to said support and spaced circumferentially of said ratchet and being engageable with said locking means for swinging said locking means in opposite directions as said carrier rotates correspondingly, said actuating means including separate members spaced circumferentially on said carrier for engaging and swinging said stop means in opposite directions as said carrier rotates correspondingly.

References Cited in the file of this patent

UNITED STATES PATENTS

| | | |
|---|---|---|
| 1,710,865 | De Leew | Apr. 10, 1929 |
| 2,262,103 | Laessker | Nov. 11, 1941 |
| 2,385,409 | Gardner | Sept. 25, 1945 |
| 2,622,487 | Schultz | Dec. 23, 1952 |
| 2,681,043 | Irwin | June 15, 1954 |
| 2,705,940 | Edwards | Apr. 12, 1955 |
| 2,754,700 | Benjamin et al. | July 17, 1956 |